Patented Dec. 23, 1930

1,786,256

UNITED STATES PATENT OFFICE

KARL J. MONRAD, OF LITTLE FALLS, NEW YORK, ASSIGNOR TO CHR. HANSEN'S LABORATORY, INC., OF LITTLE FALLS, NEW YORK, A CORPORATION OF NEW YORK

BUTTER COLORING

No Drawing.  Application filed April 13, 1927.  Serial No. 183,622.

This invention relates to food products and has for its principal object the provision of means for making more pale a rich natural butter. Further objects of the invention are the method of rendering butter more pale whether natural or artificially colored and also the composition of matter which is used for the purpose.

For some unaccountable reason the public is now demanding a paler butter than is produced by high-grade Jersey and Guernsey cows which as is well known yield a milk, the butter from which is much more highly colored than butter made from the milk of a Holstein cow and as in the case of the preference for white or dark colored eggs it is much easier to meet the wishes of the public than to attempt to educate the public, hence the present invention, which also includes within its scope the rendering more pale of butter which has been colored for one definite market which wishes a deep orange butter but which has been reshipped to a location which is now demanding the paler butter. The usual color of butter as sold is not yellow as commonly stated but is actually an orange having an appreciable amount of red in it and it is believed the masking of this red or its neutralizing by green which is nearer to blue than to red, is the essence of the present invention, altho at the present time this is not absolutely certain. It is known however, that the addition of a green or blue color to a butter will make the shade appear lighter; it will take the natural color out of uncolored June butter and it will also make the shade seem paler yellow when the butter is colored with one of the high-grade butter colors such, for example, as Hansen's Danish which is an orange coloring of vegetable origin and dissolved in a vegetable oil, or a butter which has been colored with a mixture of the certified aniline dyes such as yellow AB and yellow OB in vegetable oil.

The exact proportion of the chlorophyll or other coloring medium and the oil is not at all important nor is the nature of the vegetable oil except that naturally throughout this specification and in the claims it must be understood that both the coloring matter and the solvent of such coloring matter shall be harmless when taken in food and preferably, tho not necessarily, edible. The chlorophyll is preferably of the oil soluble type, however, chlorophyll which is sold as alcohol soluble is almost invariably oil soluble as well. The invention broadly includes the mixing with butter either natural or colored of a dye, preferably green, dissolved in either a vegetable, a mineral, or an animal oil which dye or coloring matter will neutralize the red component of the orange color of the butter and make the butter appear paler.

Of the various oils which may be used probably cotton seed oil or corn oil would be best, the latter being somewhat more advantageous in that it has a lower freezing point and also because it is one of the oils used in making butter color. A very satisfactory solution is made by dissolving a pound of oil soluble chlorophyll to each four gallons of cotton seed oil, but as stated the proportion may be changed within wide limits to suit the various fancies. Obviously a suitable aniline color could advantageously be used in place of the chlorophyll or any other dye which will neutralize the red of the orange of the butter, providing naturally that the added material will meet the rather strict requirement of the Bureau of Chemistry of the U. S. Department of Agriculture.

What I claim is:—

1. The method of lightening the color of an orange colored butter by mixing therewith a soluble green coloring matter which neutralizes the red component of the orange color.

2. Butter containing an added oil-soluble green coloring matter which lightens the color of the butter by neutralizing the red component of the orange color of the butter to make the butter appear paler.

In testimony whereof I affix my signature.

KARL J. MONRAD.